(12) United States Patent
Hidaka

(10) Patent No.: US 6,725,660 B2
(45) Date of Patent: Apr. 27, 2004

(54) CONTROL DEVICE FOR VARIABLE-GEOMETRY TURBOCHARGER

(75) Inventor: Shoshi Hidaka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/319,100

(22) Filed: Dec. 13, 2002

(65) Prior Publication Data

US 2003/0121263 A1 Jul. 3, 2003

(30) Foreign Application Priority Data

Dec. 28, 2001 (JP) ........................................ 2001-400941

(51) Int. Cl.$^7$ .............................................. F02D 23/00
(52) U.S. Cl. ........................................................ 60/602
(58) Field of Search .................................. 60/600–603

(56) References Cited

U.S. PATENT DOCUMENTS

| | | | | |
|---|---|---|---|---|
| 6,050,093 A | * | 4/2000 | Daudel et al. | 60/602 |
| 6,067,798 A | * | 5/2000 | Okada et al. | 60/602 |
| 6,155,049 A | * | 12/2000 | Bischoff | 60/602 |
| 6,247,311 B1 | * | 6/2001 | Itoyama et al. | 60/602 |
| 2001/0032465 A1 | | 10/2001 | Terry et al. | 60/602 |
| 2002/0170291 A1 | * | 11/2002 | Shirakawa | 60/602 |

FOREIGN PATENT DOCUMENTS

| | | | |
|---|---|---|---|
| EP | 0 786 589 A1 | 7/1997 | |
| EP | 1081352 A1 | * 3/2001 | F02B/37/24 |
| JP | 62-035028 | 2/1987 | |
| JP | 62210222 | 9/1987 | |
| JP | 10-077856 | 3/1998 | |
| JP | 2001-173448 | 6/2001 | |
| WO | WO 97/45633 | 12/1997 | |

OTHER PUBLICATIONS

EP Search Report for Serial No. EP 02 02 6885 dated Mar. 26, 2003.

* cited by examiner

Primary Examiner—Thomas Denion
Assistant Examiner—Thai-Ba Trieu
(74) Attorney, Agent, or Firm—McCormick, Paulding & Huber LLP

(57) ABSTRACT

In a control device for a variable-geometry turbocharger which allows adjustment of the opening of the nozzle in the turbine inlet, the basic opening target value of the nozzle is calculated on the basis of the actual engine rotational speed and load. The final opening target value of the nozzle is then calculated by adding a nozzle opening correction value VNta to this basic opening target value. In the calculation of this nozzle opening correction value VNta, the amount of variation $\Delta Ac$ in the engine load is multiplied by a correction gain calculated on the basis of the engine rotational speed and pressure ratio, and a filter processing using a specified transmission function is performed on the resulting value $\Delta Ac1$. The amount of variation in load $\Delta Ac2$ following this filter processing is used as the input value for the calculation of the nozzle opening correction value VNta.

15 Claims, 8 Drawing Sheets

FIG. 2a VNt0
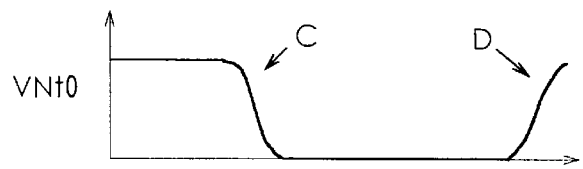
FIG. 2b VNta
FIG. 2c VNt
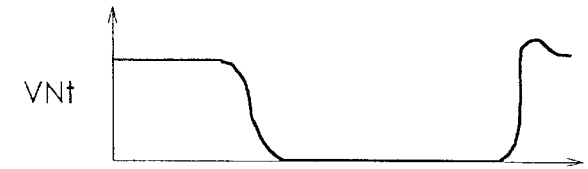
TIME
FIG. 3
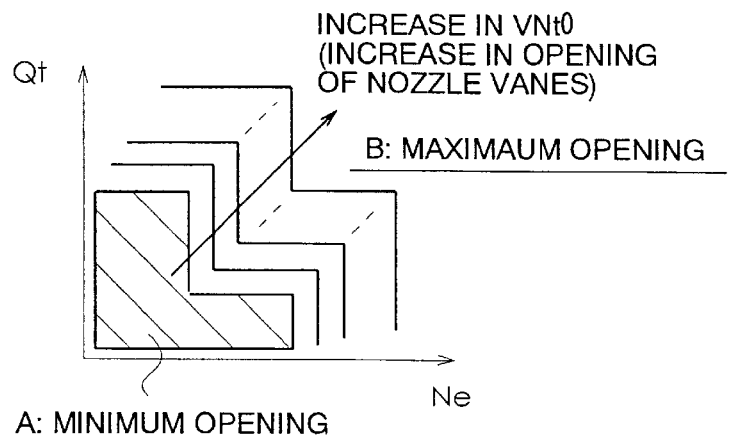
BASIC OPENING TARGET VALUE VNt0 CALCULATION MAP: M1

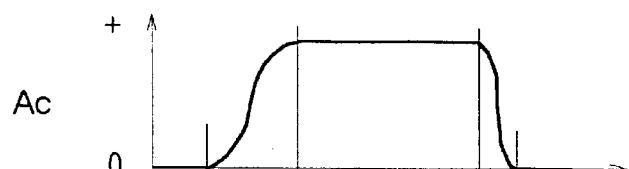
FIG. 4a  Ac
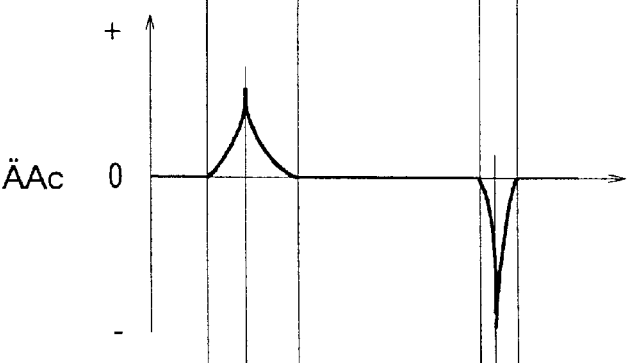
FIG. 4b  ÄAc
FIG. 4c  ÄAc1
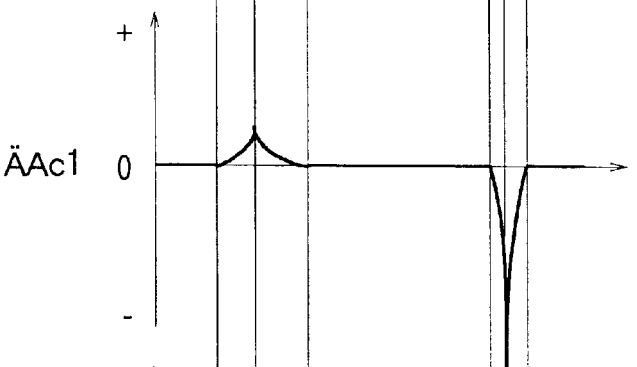
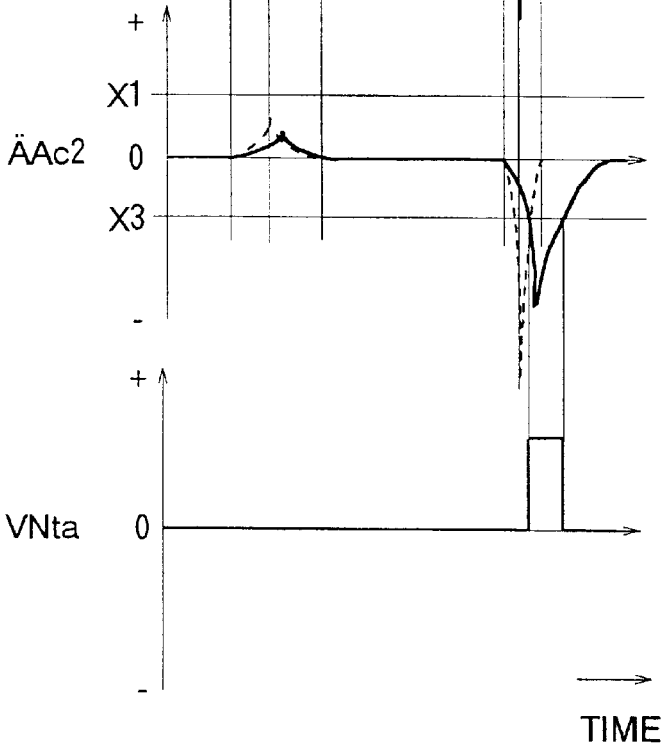
FIG. 4d  ÄAc2
FIG. 4e  VNta
TIME

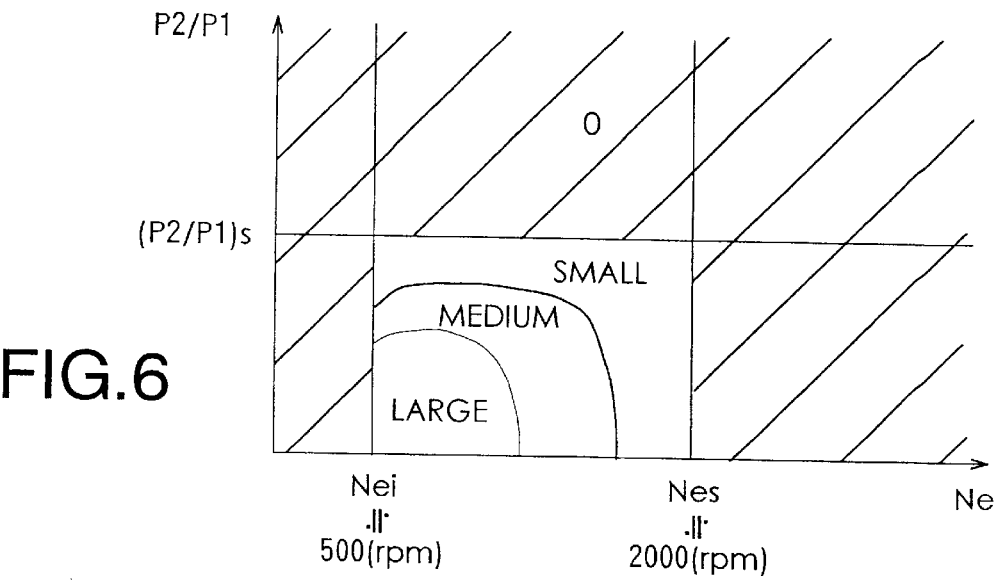
CORRECTION GAIN GVN CALCULATION MAP: M2
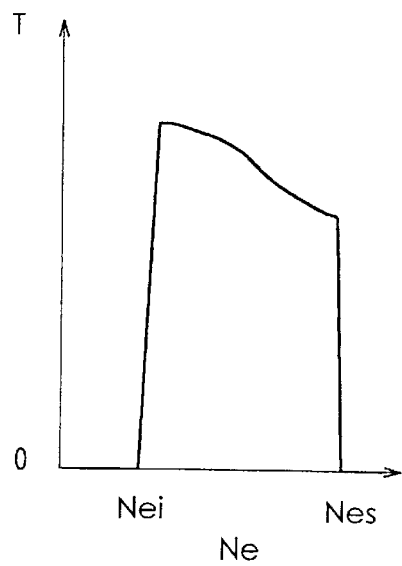
IN THE CASE OF
ACCELERATION
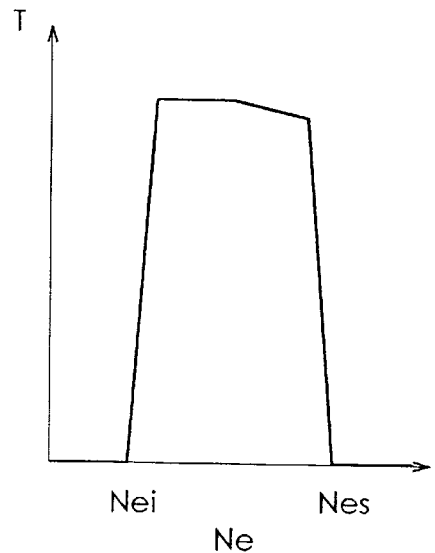
IN THE CASE OF
DECELERATION
TIME CONSTANT T CALCULATION MAP: M3

NOZZLE VANE OPENING CORRECTION
VALUE VNta CALCULATION MAP: M4

COMPRESSOR CHARACTERISTIC MAP

CONTROL DEVICE FOR VARIABLE-GEOMETRY TURBOCHARGER

CROSS REFERENCES TO RELATED APPLICATIONS

This application is entitled to the benefit of and incorporates by reference essential subject matter disclosed in Japanese Patent Application No.2001-400941 filed Dec. 28, 2001.

BACKGROUND OF THE INVENTION

1. Field of the Invention

The present invention relates to a control device for a variable-geometry turbocharger used in vehicle engines or the like, and more particularly relates to a control device for a variable-geometry turbocharger of the type that varies the volume by varying the opening, i.e., the area, of the nozzle in the turbine inlet.

2. Description of the Related Art

Variable-geometry turbochargers (hereafter also referred to as "VGT") which vary the opening of the variable nozzle in the turbine inlet in accordance with the operating conditions of the engine have been known in the past. In the case of such adjustment of the opening of the nozzle, a method in which variable nozzle vanes installed in the turbine inlet are opened and closed is generally used.

In such VGT control using nozzle vanes, the angle or opening of the nozzle vanes is varied by means of an actuator in accordance with the engine rotational speed and engine load. Furthermore, in the case of actual control, the nozzle vane opening or intake air pressure is set as a target value, and this target value is corrected in accordance with the atmospheric pressure, intake air temperature, water temperature and the like. Furthermore, in order to avoid damage to the VGT caused by excessive rotation or surging, a limit value is generally placed on the target value.

In a VGT, the velocity of the exhaust flowing into the turbine can be increased by closing down the opening of the nozzle vanes. Accordingly, in cases where the engine and turbocharger are accelerated from a low-rotation state during starting of the vehicle or the like, control is performed so that the opening of the nozzle vanes is closed down, thus producing as high a pressure as possible on the compressor outlet side by means of a small exhaust flow. On the other hand, in cases where the engine rotational speed is high and the amount of exhaust flow is large, control is performed so that the opening of the nozzle vanes is increased; in this way, a large amount of exhaust energy can be efficiently sent to the turbine.

In such VGT control, a closed loop is usually constructed in which a target value is basically set by means of a map in accordance with the engine operating conditions, and the actual value is fed back. Especially during transitional periods such as acceleration or deceleration, a separate target value is set independently from the basic map, or control is performed with a value that is obtained by adding a separately calculated correction value to the value of the basic map used as the target value.

For example, control during acceleration is performed as follows. In cases where the engine is in an idle state or a low-rotation, low-load steady operating state prior to acceleration, the opening of the nozzle vanes is ordinarily "full open" in order to reduce the exhaust resistance. Furthermore, the opening of the nozzle vanes may be varied because of requirements on the EGR control side. When there is a shift from this state to an acceleration operating state, since an intake air pressure target value that is abruptly higher is set from state in which the actual intake air pressure is low, the opening of the nozzle vanes is controlled so that this opening is closed down. As a result, the exhaust flow velocity into the turbine is ordinarily increased, so that the rotational speed of the turbocharger abruptly rises, thus causing an immediate rise in the intake air pressure so that the turbo lag is eliminated.

Furthermore, the amount fuel is increased during acceleration. However, if only the fuel is abruptly increased, this leads to an increase in smoke (in the case of a diesel engine); accordingly, a limit is placed on the amount of fuel injection itself so that an amount of fuel injection that is suited to the actual intake air amount is obtained. Consequently, in order to improve the acceleration characteristics (especially during starting of the vehicle into motion), it is necessary to accelerate the rise in the intake air pressure as far as possible, so that a large amount of intake air is supplied to the engine as quickly as possible, thus making it possible to increase the amount of fuel injection.

However, since the rotational speed of the turbocharger is still low immediately following acceleration, if the opening of the nozzle vanes is immediately closed down, this causes exhaust resistance so that the rise in the engine rotation may deteriorate, and thus rather cause a delay in the rise of the compressor outlet pressure (intake air pressure). Conventionally, therefore, a technique has been proposed in which the system is controlled so that the opening of the nozzle vanes is temporarily opened to a value that is greater than the basic target value immediately following the initiation of acceleration, or is held in a temporary open state, so that the exhaust resistance is reduced, after which the system is controlled so that the opening is closed down according to the map, thus ameliorating turbo lag (see Japanese Patent Application Laid-Open No. 2001-173448).

Meanwhile, for example, control during deceleration is performed as follows. Ordinarily, when the accelerator pedal is returned from a certain operating state, the amount of fuel injection that is required is reduced, and the engine rotation drops; at the same time, the amount of intake air is reduced (in the case of a diesel engine that has no throttle valve). In a VGT, the target value is calculated by means of a map using the engine rotation and engine load as input values. Accordingly, the system is controlled so that the nozzle vanes are gradually opened as the engine rotation drops; as a result, the rotation of the turbine also drops. However, if there is a deceleration due to an abrupt release of the accelerator pedal during acceleration under conditions close to the surge line determined by the compressor characteristics, since the rotational speed of the turbocharger has already increased to some extent, and is prevented from decelerating, i.e., dropping, because of inertia, a state is created in the compressor in which the amount of intake air is low in spite of the fact that the outlet side pressure is high, so that the phenomenon of surging occurs. As a result of this surging, an abnormal sound is generated in the compressor and intake air duct, and in regions where the pressure ratio is high, the compressor itself may be damaged. Accordingly, in regard to the problems that occur in the case of such abrupt deceleration as well, methods have been proposed in which surging is suppressed by temporarily opening the nozzle vanes of the VGT, or holding these vanes open for a time, immediately following deceleration, so that lowering of the turbine rotation is promoted, thus causing a lowering of the pressure on the outlet side of the compressor (see Japanese Patent Publication No. H6-72545 and Japanese Patent Application Laid-Open No. H10-77856).

Thus, in cases where there is either an abrupt acceleration or abrupt deceleration, it is desirable that the opening of the nozzle vanes be controlled so that a correction value is temporarily added to the control value on the basic map, or so that the nozzle vanes are opened independently from the basic map. However, for example, the following problems occur when temporary opening of the abovementioned type is attempted on the basis of the detected value of the acceleration or deceleration alone, e.g., the variation in the amount of depression of the accelerator pedal per predetermined unit time alone.

(1) In cases where an acceleration again occurs in a short time after a temporary deceleration that follows an initial acceleration, the rotational speed of the turbocharger itself is sufficiently high, so that there is no need for a temporary opening of the nozzle vanes (there is no worsening of the exhaust resistance). Nevertheless, such a temporary opening occurs, so that there is a wasteful escape of exhaust energy.

(2) If the abovementioned control is used, the nozzle vanes are also abruptly opened in cases where there is an acceleration from a state in which the nozzle vanes are open such as an idle state or the like (after being temporarily closed down, the nozzle vanes move in the opening direction in accordance with the rise in the engine rotation), and an abrupt deceleration occurs at an intermediate point in this acceleration in a state in which the rotational speed of the turbocharger has not yet increased to any great extent. In cases where there are no deleterious effects such as surging or the like, it is desirable to maintain the rotational speed of the turbocharger at a high value in order to optimize the response during acceleration. However, if the nozzle vanes are uniformly opened because of an abrupt deceleration, there is a wasteful escape of exhaust energy in the same manner as described above.

SUMMARY OF THE INVENTION

Accordingly, the present invention was created in light of the abovementioned problems; it is an object of the present invention to prevent the wasteful escape of exhaust energy during transitional operation such as acceleration, deceleration or the like.

A control device for a variable-geometry turbocharger in an engine having nozzle opening adjustment means for adjusting the opening of the nozzle in the turbine inlet comprises detection means for detecting the rotational speed and load of the abovementioned engine, and the pressure on at least the compressor outlet side of the abovementioned turbocharger, basic opening target value calculating means for calculating the basic opening target value of the nozzle on the basis of the detected values of the rotational speed and load of the engine, load variation amount calculating means for calculating the amount of variation in the engine load per predetermined time on the basis of the detected value of the engine load, pressure ratio calculating means for calculating the pressure ratio between the compressor outlet and inlet sides on the basis of the detected value of at least the pressure on the compressor outlet side, correction gain calculating means for calculating the correction gain on the basis of the detected value of the engine rotational speed and the pressure ratio, corrected load variation amount calculating means for calculating the amount of variation in the load following correction on the basis of the correction gain and the engine load variation amount, nozzle opening correction value calculating means for calculating the nozzle opening correction value on the basis of the amount of variation in the load following correction, final opening target value calculating means for calculating the final opening target value of the nozzle on the basis of the basic opening target value and the nozzle opening correction value, and operating means for operating the nozzle opening adjustment means so that the actual opening of the nozzle is an opening that corresponds to the final opening target value.

Furthermore, the corrected load variation amount calculating means are means that calculate the amount of variation in the load following correction by multiplying the engine load variation amount by the correction gain, and the correction gain calculated by the correction gain calculating means is set so that this correction gain varies from a value smaller than 1 to a value exceeding 1 as the detected value of the engine rotational speed or the pressure ratio becomes smaller.

Additionally, the correction gain calculated by the correction gain calculating means is a value other than zero when the detected value of the engine rotational speed is equal to or less than a specified value and the pressure ratio is equal to or less than a specified value, and the correction gain is zero otherwise.

A control device for a variable-geometry turbocharger having nozzle opening adjustment means for adjusting the opening of the nozzle in the turbine inlet comprises detection means for detecting the rotational speed and load of the engine, and the pressure on at least the compressor outlet side of the turbocharger, basic opening target value calculating means for calculating the basic opening target value of the nozzle on the basis of the detected values of the rotational speed and load of the engine, load variation amount calculating means for calculating the amount of variation in the engine load per predetermined time on the basis of the detected value of the engine load, filter processing performing means for performing a filter processing using a specified transmission function on the basis of the amount of variation in the engine load, and calculating the amount of variation in the load following this filter processing, nozzle opening correction value calculating means for calculating the nozzle opening correction value on the basis of this amount of variation in the load following the filter processing, final opening target value calculating means for calculating the final opening target value of the nozzle on the basis of the basic opening target value and the nozzle opening correction value, and operating means for operating the nozzle opening adjustment means so that the actual opening of the nozzle is an opening that corresponds to the final opening target value.

Furthermore, the transmission function is a time constant that is determined beforehand on the basis of the engine rotational speed.

Additionally, the transmission function is a transmission function of a first-order delay element.

Moreover the final opening target value calculating means calculate the final opening target value by adding the opening correction value to the basic opening target value.

A control device for a variable-geometry turbocharger having nozzle opening adjustment means for adjusting the opening of the nozzle in the turbine inlet comprises detection means for detecting the rotational speed and load of the engine, and the pressure on at least the compressor outlet side of the turbocharger, basic opening target value calculating means for calculating the basic opening target value of the nozzle on the basis of the detected values of the rotational speed and load of the engine, load variation amount calculating means for calculating the amount of variation in the engine load per predetermined time on the basis of the detected value of the engine load, pressure ratio calculating means for calculating the pressure ratio between the compressor outlet and inlet sides on the basis of the detected value of at least the pressure on the compressor outlet side, correction gain calculating means for calculating the correction gain on the basis of the detected value of the engine rotational speed and the pressure ratio, corrected load variation amount calculating means for calculating the amount of variation in the load following correction on the basis of the correction gain and the engine load variation amount, filter processing performing means for performing a filter processing using a specified transmission function on the basis of the amount of variation in the load following correction, and calculating the amount of variation in the load following this filter processing, nozzle opening correction value calculating means for calculating the nozzle opening correction value on the basis of the amount of variation in the load following the filter processing, final opening target value calculating means for calculating the final opening target value of the nozzle on the basis of the basic opening target value and the nozzle opening correction value, and operating means for operating the nozzle opening adjustment means so that the actual opening of the nozzle is an opening that corresponds to the final opening target value.

A control method for a variable-geometry turbocharger having nozzle opening adjustment means for adjusting the opening of the nozzle in the turbine inlet comprises the steps of detecting the rotational speed and load of the engine, and the pressure on at least the compressor outlet side of the turbocharger, calculating the basic opening target value of the nozzle on the basis of the detected values of the rotational speed and load of the engine, calculating the amount of variation in the engine load per predetermined time on the basis of the detected value of the engine load, calculating the pressure ratio between the compressor outlet and inlet sides on the basis of the detected value of at least the pressure on the compressor outlet side, calculating the correction gain on the basis of the detected value of the engine rotational speed and the pressure ratio, calculating the amount of variation in the load following correction on the basis of the correction gain and the engine load variation amount, performing a filter processing using a specified transmission function on the basis of the amount of variation in the load following correction, and calculating the amount of variation in the load following this filter processing, calculating the nozzle opening correction value on the basis of the amount of variation in the load following the filter processing, calculating the final opening target value of the nozzle on the basis of the basic opening target value and the nozzle opening correction value, and operating the nozzle opening adjustment means so that the actual opening of the nozzle is an opening that corresponds to the final opening target value.

BRIEF DESCRIPTION OF THE DRAWINGS

FIGS. 2a through 2c are time charts showing an outline of the correction of the opening of the nozzle vanes.

FIG. 3 is a map for calculating the basic opening target value of the nozzle vanes.

FIGS. 4a through 4e are time charts showing the trends of various values in the correction amount calculation processing.

FIG. 6 is a correction gain calculation map.

FIGS. 7a and 7b are time constant calculation maps.

DESCRIPTION OF THE PREFERRED EMBODIMENTS

A preferred embodiment of the present invention will be described in detail below with reference to the attached figures.

Figure 1:
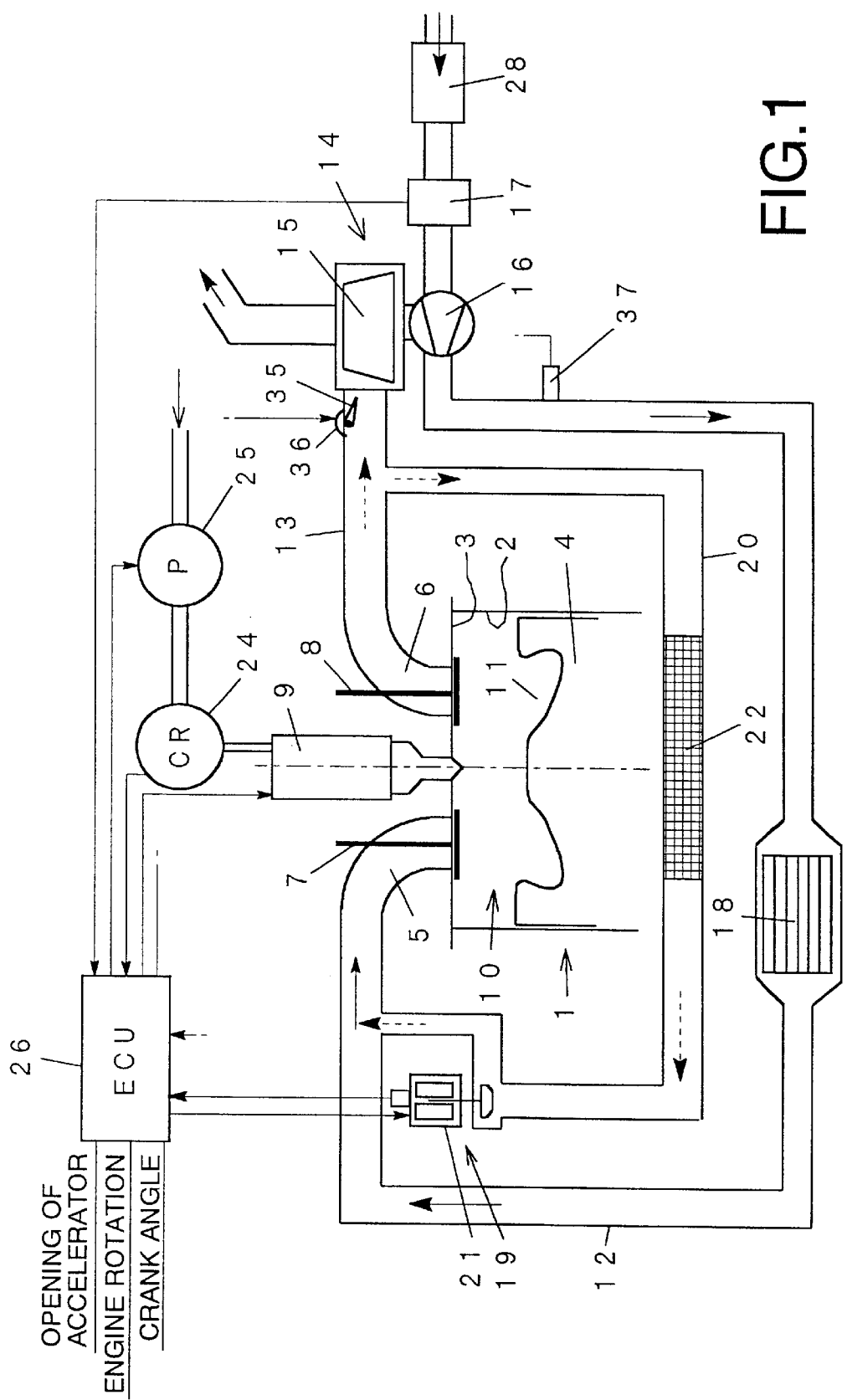
FIG. 1 is a system diagram of the engine of the present embodiment.

FIG. 1 is an overall view of an engine to which the present invention is applied. The engine in the present embodiment is a vehicular diesel engine, and is in particular a common rail type diesel engine equipped with a common rail type fuel injection device.

1 indicates the engine main body; this is constructed from a cylinder 2, cylinder head 3, piston 4, intake port 5, exhaust port 6, intake valve 7, exhaust valve 8, injector 9 (used as a fuel injection valve) and the like. A combustion chamber 10 is formed inside the cylinder 2, and fuel is injected into the combustion chamber 10 from the injector 9. A cavity 11 is formed in the top part of the piston 4, and this cavity 11 forms a portion of the combustion chamber 10. The injector 9 is positioned substantially coaxially with the cylinder 2, and simultaneously injects fuel in a radial pattern from a plurality of injection holes. The intake port 5 is connected to an intake pipe 12, and the exhaust port 6 is connected to an exhaust pipe 13. The intake port 5 and intake pipe 12 form an intake passage, and the exhaust port 6 and exhaust pipe 13 form an exhaust passage.

Furthermore, a variable-geometry turbocharger 14 is installed in this engine, so that exhaust energy is used for supercharging of intake air. 15 indicates a turbine, and 16 indicates a compressor. In order to adjust the opening (i.e., area) of the nozzle of the turbine inlet, a plurality of variable nozzle vanes 35 (only one of these vanes is shown in the figures) are installed in the turbine inlet so that these nozzle vanes 35 can pivot; furthermore, a vane actuator 36 which is used to open and close these nozzle vanes 35 is provided. As a result of the pivoting action of the nozzle vanes 35, the nozzle vanes 35 can assume any arbitrary position ranging from fully open (maximum opening) to fully closed (minimum opening). In the present embodiment, the actuator 36 is an electrical actuator utilizing an electric motor; however, it would also be possible (for example) to use a mechanical type actuator (diaphragm or the like) utilizing the negative pressure of the intake air, a hydraulic type actuator or the like.

Intake air flow detection means used to detect the amount of flow of intake air that is actually taken in to the intake passage are disposed on the upstream side of the compressor 16. Here, the intake air flow detection means consist of an air mass sensor 17 used to detect the mass of the intake air. An air cleaner 28 is disposed on the upstream side of the air mass sensor 17. A sensor which is used to detect the pressure on the outlet side of the compressor, i.e., an intake air pressure sensor 37, is disposed on the downstream side of the compressor 16. Furthermore, it would also be possible to add a sensor that is used to detect the pressure on the inlet side of the compressor, although this is omitted in the present embodiment. For example, such a sensor might conceivable consist of a sensor that detects the internal pressure of the intake passage on the upstream side of the compressor, a sensor which is open to the atmosphere and detects the atmospheric pressure, or the like. An inter-cooler 18 which is used to cool the intake air is disposed on the downstream side of the intake air pressure sensor 37.

This engine is also equipped with an EGR device 19. The EGR device 19 is equipped with an EGR pipe 20 that communicates between the intake pipe 12 and exhaust pipe 13 as an EGR passage, an EGR valve 21 which is installed at an intermediate point in the EGR pipe and which is used to adjust the amount of EGR, and an EGR cooler 22 that cools the EGR gas on the upstream side of the EGR valve 21.

The injector 9 is connected to a common rail 24, and high-pressure fuel (20 to 200 MPa) corresponding to the injection pressure which is stored in this common rail 24 is constantly supplied to the injector 9. Fuel that is pressure-fed by a high-pressure pump 25 is supplied to this common rail 24 at all times.

An electronic control unit (hereafter referred to as an "ECU") 26 is provided for electronic control of this engine. The ECU 26 detects the actual operating conditions of the engine by means of various sensors, and controls the injector 9, EGR valve 21, vane actuator 36, and a metering valve (not shown in the figures) that regulates the amount of fuel that is pressure-fed into the common rail 24 from the high-pressure pump 25, on the basis of these engine operating conditions. In addition to the air mass sensor 17 and intake air pressure sensor 37, the sensors include an accelerator opening sensor, an engine rotational speed sensor and a common rail pressure sensor (none of which is shown in the figures), and the system is arranged so that the actual amount of air intake flow, the pressure on the outlet side of the compressor, the opening of the accelerator, the engine rotational speed (in concrete terms, the engine rpm), the crank angle of the engine, the common rail pressure and the like are detected by the ECU 26.

The injector 9 has an electromagnetic solenoid which is switched on and off by the ECU 26. When the electromagnetic solenoid is switched on, the injector 9 is in an open state, and fuel is injected; when the electromagnetic solenoid is switched off, the injector 9 is in a closed state, and the injection of fuel is stopped. The ECU 26 determines the target fuel injection amount and the target fuel injection timing from the actual rotational speed of the engine and the opening of the accelerator, and actually switches the electromagnetic solenoid on at this timing for a time corresponding to the target fuel injection amount. The "on" time increases with an increase in the target fuel injection amount.

Furthermore, the ECU 26 determines the target common rail pressure in accordance with the operating conditions of the engine, and performs feedback control of the common rail pressure so that the actual common rail pressure approaches the target common rail pressure.

Next, the control device for the variable-geometry turbocharger 14 in the present embodiment will be described.

The turbocharger 14 is a variable-geometry type turbocharger whose volume is varied by adjusting the opening of the nozzle of the turbine inlet. In the present embodiment, nozzle vanes 35 are installed as these nozzle opening adjustment means. However, the present invention is not limited to such a configuration; it would also be possible to adjust the opening of the nozzle by some other method.

The control of the opening of the nozzle vanes is basically performed for specified time intervals in accordance with the basic opening target value calculation map M1 shown in FIG. 3, which is stored beforehand in the ECU 26. This map M1 is prepared beforehand by experimentation using an actual apparatus so that the optimal basic opening target value VNt0 for the nozzle vanes 35 is determined from the engine rotational speed Ne and the target fuel injection amount Qt. The ECU 26 calculates the target fuel injection amount Qt from the actual engine rotational speed Ne detected by the engine rotational speed sensor, and the actual opening Ac of the accelerator detected by the accelerator opening sensor; the ECU 26 further calculates the basic opening target value according to the map in FIG. 3 from the engine rotational speed Ne and target fuel injection amount Qt. The opening of the nozzle vanes increases (toward the opening side) with an increase in the basic opening target value VNt0.

In this map M1, the basic opening target value VNt0 is determined so that the opening of the nozzle vanes shows a minimum value (fully closed) in the hatched region A, where the engine rotational speed Ne and target fuel injection amount Qt show minimum values, and so that the opening of the nozzle vanes increases as the engine rotational speed Ne or target fuel injection amount Qt increases from this region A, with this opening showing a maximum value (fully open) in the region B.

Furthermore, the target fuel injection amount Qt is a value that is used as a substitute value for the engine load. The opening Ac of the accelerator may also be used as such a substitute value. Furthermore, the demand torque, which is a demand value from the side of the vehicle, may also be used as a substitute value. Accordingly, the terms "(target) fuel injection amount", "opening of the accelerator" and "demand torque" are all interchangeable with the term "engine load". Furthermore, the term "demand torque" generally refers to a value used as an engine torque control parameter that is output from a controller used for vehicle control to the controller used for engine control (corresponding to the ECU 26 in the present embodiment) in vehicles in which braking control of the vehicle is accomplished by means of an anti-lock brake system, anti-skid control system or the like.

In the present embodiment, separately from this, control of the opening of the nozzle vanes is performed according to a separate map or the like on the basis of requirements from the EGR control side during idle operation of the engine. The system is devised so that a sufficient amount of EGR can be maintained by appropriately closing down the opening of the nozzle vanes so that a pressure difference is created on the upstream and downstream sides of the EGR passage 20. Furthermore, the opening of the nozzle vanes is controlled to an opening which is such that an especially appropriate amount of EGR is obtained.

Assuming that the control of the opening of the nozzle vanes is accomplished by the above means alone, then, for example, if the accelerator pedal is depressed so that there is a shift to a state of acceleration from a state in which the opening of the nozzle vanes is a specified opening as required from the EGR side during idle operation, this results in a case in which the engine rotational speed Ne is low, and the target fuel injection amount Qt is increased. Accordingly, the minimum basic opening target value VNt0 is calculated in accordance with the map M1 in FIG. 3, and at the same time, the vane actuator 36 is controlled so that the actual opening of the nozzle vanes is the minimum opening. As a result, exhaust at a high flow velocity is blown into the turbine 15, so that the turbocharger rotational speed abruptly rises, and the intake air pressure also quickly rises, thus eliminating turbo lag.

During transitional operation of the engine such as acceleration or deceleration, the following correction of the opening of the nozzle vanes is performed.

FIGS. 2a through 2c show an outline of the correction control during such transitional operation. FIG. 2a shows how the basic opening target value Vnt0 (i.e., the basic opening of the nozzle vanes) obtained from the map M1 varies, FIG. 2b shows how the nozzle vane opening correction value VNta (i.e., the amount of correction of the opening of the nozzle vanes) varies, and FIG. 2c shows how the final opening target value VNt (i.e., the final opening of the nozzle vanes) varies. The final opening target value VNt is the sum of the basic opening target value VNt0 and opening correction value VNta. In the case of the transition period C, the opening correction value VNta is zero, so that no substantial correction is performed. Meanwhile, in the case of the transition period D, the opening correction value VNta is a positive value, so that a correction is performed in the direction that increases the opening of the vanes. The fact that a correction is thus either performed or not performed according to the transition state is a characterizing feature of the present invention.

Figure 9:
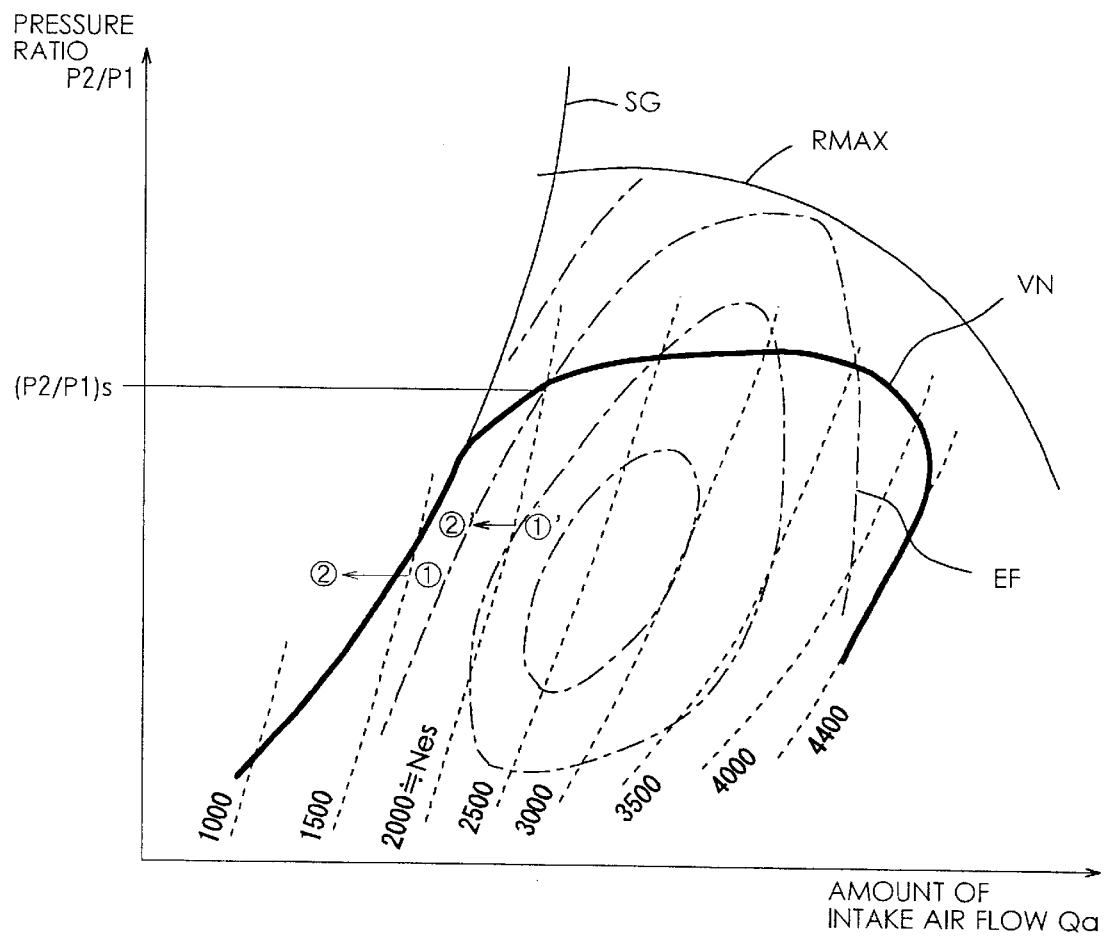
FIG. 9 is a compressor characteristic map.

FIG. 9 is a characteristic map of the compressor 16 of the turbocharger 14 in the present embodiment; this map was obtained by experimentation using an actual apparatus. The horizontal axis indicates the intake air flow amount Qa; this corresponds to the amount of intake air flow (amount of fresh air) detected by the air mass sensor 17. The vertical axis indicates the pressure ratio P2/P1 between the outlet and inlet sides of the compressor 16. This is the ratio of the pressure P2 on the outlet side of the compressor detected by the intake air pressure sensor 37 to the pressure P1 on the inlet side of the compressor set as a fixed value that is stored in the ECU 26 beforehand. Furthermore, the pressure P1 on the inlet side of the compressor is a value that corresponds to atmospheric pressure. In cases where a sensor that actually measures the pressure on the inlet side of the compressor is provided, this actually measured value may be used.

SG indicates the surge line; when the operating state of the compressor enters the region on the left side of this line (i.e., the surge region), the phenomenon of surging occurs, which is undesirable. Specifically, the reason for this is as follows: in this surge region, the flow passing through the compressor is smaller than the minimum permissible amount of flow determined by the rotational speed of the impeller, so that the pressure on the outlet side of the compressor exceeds the pressure on the inlet side. As a result, the phenomenon of back flow occurs, so that the impeller shows violent vibration; furthermore, surge noise is generated, and in the worst case, this may lead to damage of the impeller. Accordingly, it is desirable that control be performed so that entry into the surge region is prevented as far as possible.

RMAX is the upper limit line of rotation. If the region above this line is entered, the rotation of the compressor becomes excessive, and problems in terms of durability arise. Accordingly, rotation is suppressed by means of an excessive rotation preventing device (e.g., an exhaust bypass device or the like) not shown in the figures. The respective numerical values indicated by broken lines are engine rpm values. The respective ellipses EF are compressor efficiency diagrams; the efficiency increases toward the center. Furthermore, the solid line VN indicates the compressor operating track constituting the target that is to be achieved by control of the opening of the nozzle vanes. Specifically, control of the opening of the nozzle vanes is performed so that the operating state of the compressor always follows this track VN. This track VN passes through the vicinity of the surge line SG, and is in position that is somewhat removed from the rotation upper limit line RMAX on the low pressure ratio side.

For example, when the compressor is in the operating state indicated by (1) during acceleration or high-load operation of the engine, if there is a change to the operating state indicated by (2) on the left side of the surge line SG as a result of deceleration, surging will occur, so that this is undesirable. In such a case, therefore, it is effective to control the opening of the nozzle vanes so that the vanes are temporarily opened (or held open for a time). Specifically, during acceleration or high-load operation of the engine, the opening of the nozzle vanes is closed down, and the rotational speed of the turbine is a relatively high rotational speed; accordingly, intake air flow and pressure ratio conditions which are such that surging does not occur are produced on the compressor side as well. If the accelerator pedal is abruptly returned in this state so that the engine enters a state of deceleration, a state is produced in which the rotational speed is prevented from dropping by inertia on the turbine side so that a high speed is maintained in spite of the fact that the fuel injection amount is reduced and the rotational speed and amount of intake air flow are abruptly reduced on the engine side. Accordingly, a state in which the amount of air intake flow is small and the pressure ratio is high is also produced on the compressor side, so that the system abruptly enters the surge region. Accordingly, if a control action that temporarily increases the opening of the nozzle vanes is performed immediately after deceleration, the flow velocity of the exhaust striking the turbine is abruptly reduced, so that a state resembling the application of a braking force to the turbine is produced, thus making it possible to achieve an abrupt decrease in the rotational speeds of the turbine and compressor. As a result, the compressor pressure ratio can be reduced, so that surging can be prevented.

However, even if there is a shift from the operating state indicated by (1)', which is removed to the right side of the surge line SG, to the operating state indicated by (2)', which approaches the surge line SG, the problem of surging does not occur, since the operating state indicated by (2)' is on the right side of the surge line SG. Accordingly, there is no need to perform a control action that temporarily opens the nozzle vanes. However, in the case of conventional control, since control that temporarily opens the nozzle vanes is uniformly performed in accordance with the amount of variation in the opening of the accelerator or the like, such control is performed in this case as well. In such a case, exhaust energy is allowed to escape in a wasteful manner so that the effective utilization of this energy cannot be achieved; furthermore, since the painstakingly increased turbine rotation drops, time is required in order to increase the turbine rotation again in the case of a subsequent re-acceleration, so that turbo lag occurs.

A similar problem also occurs in the case of acceleration. In a state in which the turbine rotation has risen to some extent, e.g., a state in which the engine has left the idle state or low-rotation, low-load operating steady operating state after the vehicle has started into motion, if the accelerator pedal is abruptly depressed so that a state of acceleration is entered, the opening of the nozzle vanes is temporarily increased in a uniform manner in the case of conventional control. In this case, however, the engine rpm and turbine inlet pressure have already risen to some extent immediately prior to the acceleration; accordingly, even if the opening of the nozzle vanes is closed down, the effect of the exhaust resistance is not a problem. Accordingly, a control action that temporarily opens the nozzle vanes has a reverse effect, and this also results in the wasteful escape of exhaust energy. In this case, it is conversely desirable to control the opening of the nozzle vanes in the direction that closes down this opening, so that the rise of the turbine rotation is accelerated.

The present invention is based on such a concept; in short, the question of whether or not it is necessary to perform a control action of the abovementioned type that temporarily opens the nozzle vanes is judged on the basis of the operating conditions during transitional operation of the engine. In cases where such a control action is unnecessary, this control action is not performed; as a result, the wasteful escape or discarding of exhaust energy is prevented.

This will be described in detail below. In this control, as is shown in FIGS. 2a through 2c, the final opening target value VNt is calculated by adding the opening correction value VNta to the basic opening target value Vnt0. In particular, in regard to the calculation of the opening correction value VNta, a fixed limit is applied to the correction of the opening of the nozzle vanes by setting the value of VNta at zero or at a value on the side of an increased opening in accordance with the transitional operating conditions.

Figure 10:
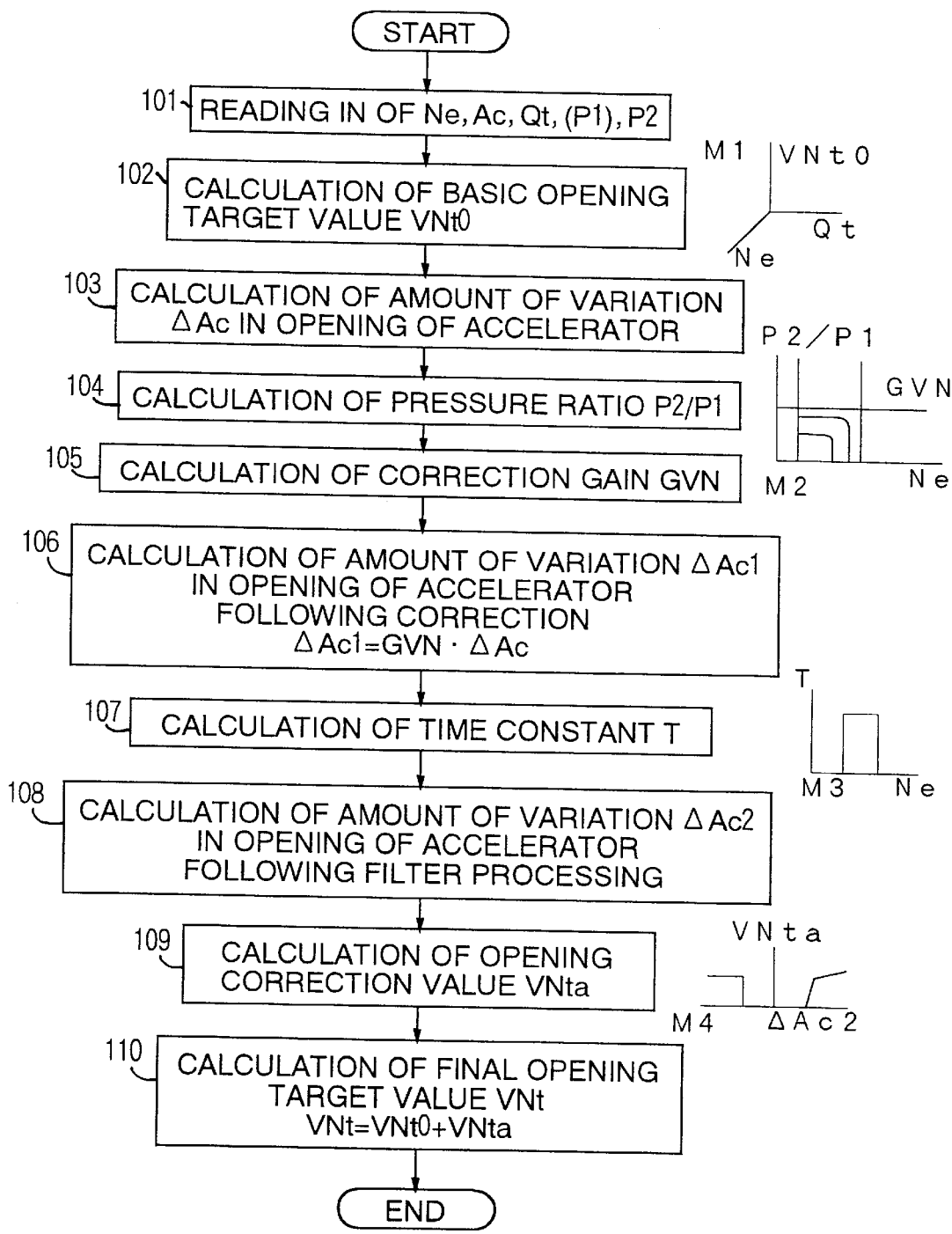
FIG. 10 is a flow chart relating to the correction amount calculation processing.

First, an outline of this control procedure will be described with reference to the flow chart shown in FIG. 10. This flow is performed at specified control times by the ECU 26.

First of all, the detected values of the actual accelerator opening Ac, the engine rpm Ne and the compressor outlet side pressure (intake air pressure) P2 are read in, and the target fuel injection amount Qt calculated on the engine control side is read in (step 101). In this case, if the actual pressure P1 on the inlet side of the compressor is detected, this value is also read in. Next, on the basis of the engine rpm Ne and target fuel injection amount Qt, the basic opening target value VNt0 is calculated in accordance with the basic opening target value calculation map M1 shown in FIG. 3 (step 102). Afterward, the amount of variation ΔAc in the opening of the accelerator per predetermined unit time, and in control terms, the differential value of the accelerator opening Ac, are calculated (step 103). This is a value that is obtained by subtracting the previous accelerator opening Ac (n−1) from the current accelerator opening Ac (n). Next, the pressure ratio P2/P1 is calculated (step 104). P1 is a fixed value that is stored beforehand in the ECU 26; however, in cases where this value is detected, the detected value is used.

Then, the correction gain GVN is calculated on the basis of the engine rpm Ne and the pressure ratio P2/P1 in accordance with the correction gain calculation map M2 shown in FIG. 6 (step 105). Next, the amount of variation ΔAc1 in the opening of the accelerator following correction is calculated on the basis of the already calculated amount of variation ΔAc in the opening of the accelerator and the correction gain GVN (step 106). The amount of variation ΔAc1 in the opening of the accelerator following correction is a value that is obtained by multiplying the amount of variation ΔAc of the opening of the accelerator by the correction gain GVN. Next, the time constant T is calculated on the basis of the engine rpm Ne in accordance with the time constant calculation map M3 shown in FIG. 7 (step 107). Then, a filter processing (described later) is performed on the basis of the amount of variation ΔAc1 in the opening of the accelerator following correction, and the amount of variation ΔAc2 in the opening of the accelerator following this filter processing is calculated (step 108). This amount of variation ΔAc2 in the opening of the accelerator following the filter processing is calculated according to a predetermined transmission function using the time constant T.

Figure 8:
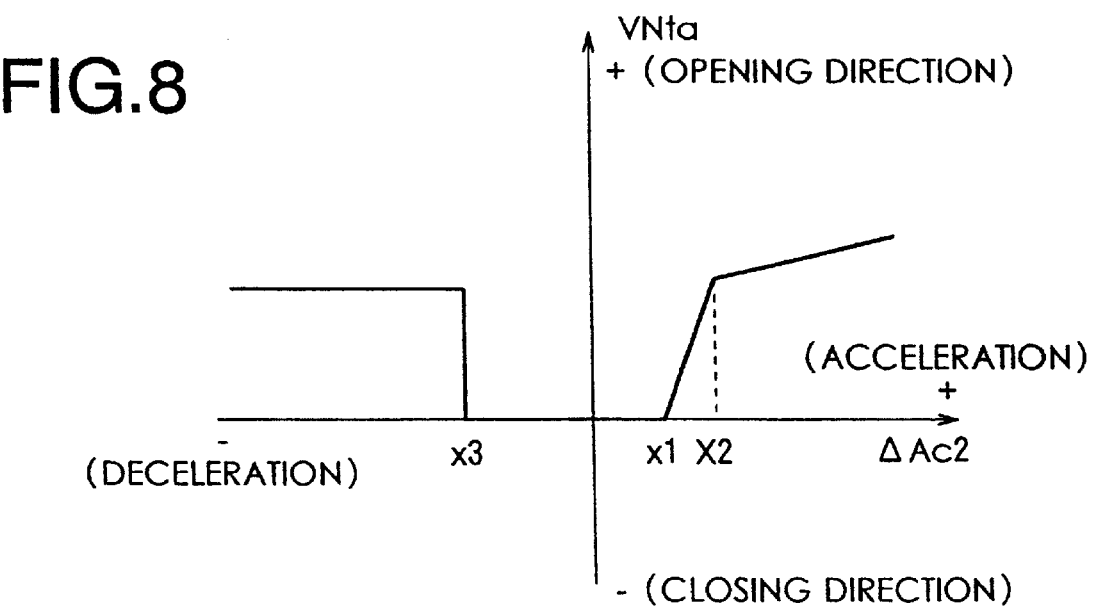
FIG. 8 is an opening correction value calculation map.

Next, the opening correction value VNta of the nozzle vanes is calculated on the basis of the amount of variation ΔAc2 in the opening of the accelerator following correction in accordance with the nozzle vane opening correction value calculation map M4 shown in FIG. 8 (step 109). Then, the final opening target value VNt of the nozzle vanes is calculated by adding this opening correction value VNta to the basic opening target value VNt0 (step 110). As a result, this flow is completed, and a signal corresponding to the final opening target value VNt is sent out to the vane actuator 36. As a result, the actual-opening of the nozzle vanes 35 is controlled to an opening that corresponds to this final opening target value VNt.

Figure 5:
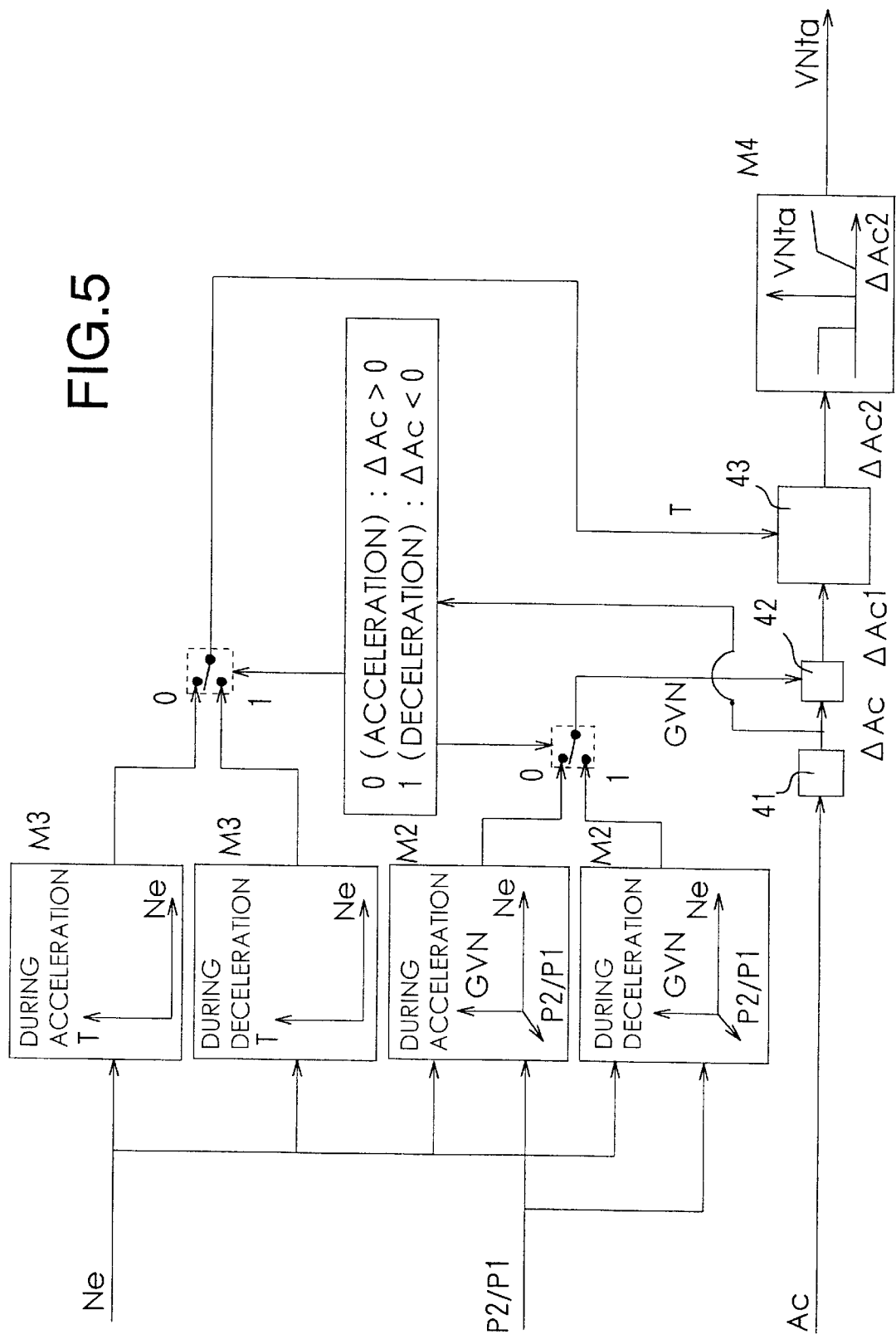
FIG. 5 is a block diagram relating to the correction amount calculation processing.

The portions of the abovementioned processing that relate to the calculation of the amount of correction (steps 103 through 109) are also shown in the block diagram of FIG. 5. Two different correction gain calculation maps M2 and time constant calculation maps M3 are prepared for acceleration and deceleration, and one or the other of these maps is used depending on whether the transitional state is acceleration or deceleration. In regard to the judgement of such acceleration or deceleration, cases in which the amount of variation ΔAc in the opening of the accelerator is greater than zero are judged to be acceleration, and cases in which the amount of variation ΔAc in the opening of the accelerator is less than zero are judged to be deceleration. The calculation of the amount of variation ΔAc in the opening of the accelerator (step 103) is performed by a differentiator 41, and the calculation of the amount of variation ΔAc1 in the opening of the accelerator following correction (step 106) is performed by a multiplier 42. Furthermore, the calculation of the amount of variation ΔAc2 in the opening of the accelerator following the filter processing (step 108) is performed by a calculator 43. The differentiator 41, multiplier 42 and calculator 43 are installed in the ECU 26.

FIGS. 4a through 4e are time charts that show the trends of respective values in the correction amount calculation processing. First, as is shown in FIG. 4a, a case is envisioned in which the opening Ac of the accelerator is increased from a state of zero as a result of the operation of the accelerator pedal by the driver (acceleration), and is then again decreased to zero (deceleration) after being maintained at a fixed opening for a fixed time. As is shown in the figure, the rate of decrease in the opening Ac of the accelerator is greater than the rate of increase.

When the opening Ac of the accelerator is differentiated for these respective times, the amount of variation ΔAc of the opening of the accelerator shown in FIG. 4b is obtained. This processing is performed by step 103 in FIG. 10 and the differentiator 41 in FIG. 5. Furthermore, in conventional methods, correction is merely performed if the absolute value of this amount of variation ΔAc in the opening of the accelerator exceeds a specified value.

Next, when the amount of variation ΔAc in the opening of the accelerator shown in FIG. 4b is multiplied by the correction gain GVN, the amount of variation ΔAc1 in the opening of the acceleration following correction that is shown in FIG. 4c is obtained. This processing is performed by step 106 in FIG. 10 and the multiplier 42 in FIG. 5. A characterizing feature here is that while the absolute value of the peak value is decreased in the waveform that occurs in the case of acceleration, the absolute value of the peak value is increased in the waveform that occurs in the case of deceleration. Furthermore, the time relationship of the respective waveforms in the shift from FIG. 4b to FIG. 4c is maintained as the same relationship.

The reasons that the absolute values of the abovementioned peak values are increased or decreased are indicated below. The map M2 shown in FIG. 6 is prepared in association with the compressor characteristic map shown in FIG. 9; in this map M2, a value that is not zero is set for the correction gain GVN when the engine rpm Ne is in a range which is such that (idle rpm Nei)$\leq$Ne$\leq$(specified threshold value Nes), and the pressure ratio P2/P1 is in a range which is such that P2/P1$\leq$(specified threshold value (P2/P1)s) (this is called the effective region), and a value of zero is set for the correction gain GVN in all other ranges (this is called the ineffective region). In the present embodiment, the idle rpm Nei is approximately 500 (rpm), the engine rpm threshold value Nes is approximately 2000 (rpm) and, as shown in FIG. 9, the pressure ratio threshold value (P2/P1)s is the value that is obtained where the engine rpm line diagram at the threshold value Nes intersects the target compressor operating track VN.

Furthermore, in the effective region of the map M2, the value of the correction gain GVN is set so that the correction gain GVN varies from a value exceeding 1 to a value that is less than 1 as the engine rpm Ne or pressure ratio P2/P1 becomes smaller. In the example shown in the figures, a large, medium or small value is set in accordance with the engine rpm Ne and pressure ratio P2/P1; for example, the large value is 1.3, the medium value is 1.0, and the small value is 0.7. The characteristics of the abovementioned maps are common to both acceleration and deceleration; only the conditions of the numerical values are slightly different.

The setting of these maps is based on the following approach: as may be seen from a comparison of the map M2 shown in FIG. 6 and the characteristic map shown in FIG. 9, the effective region includes the surge line SG and surrounding area. Furthermore, for example, since surging occurs during deceleration in which the operating conditions vary as shown in (1)$\rightarrow$(2), it is necessary in this case to perform a control action that temporarily opens the nozzle vanes. In other words, the position of the operating conditions on the characteristic map of FIG. 9 during transitional operation is important; if the current engine rpm Ne and pressure ratio P2/P1 are known, then the position on the characteristic map of FIG. 9 can be specified, so that it can be ascertained how close this position is to the surge line SG. Accordingly, as the position moves toward the left side of the surge line SG, it is effective to increase the correction amount so that the opening of the nozzle vanes is corrected in the opening direction. For this reason, a large correction gain value GVN is set in the effective region of the map shown in FIG. 6 as the rotation or pressure ratio drops. Conversely, in positions that are removed from the surge line SG, it is advisable to reduce the correction amount or set this correction amount at zero, so that the nozzle vanes are closed down as far as possible, thus achieving effective utilization of the exhaust energy. For this reason, a small correction gain value GVN is set in the effective region of the map shown in FIG. 6 in the case of high rotation or a high pressure ratio, and a correction gain value GVN of zero is set in the ineffective region.

Conversely, in the case of acceleration, the exhaust resistance becomes a problem when the engine is idling or in a low-rotation steady operating state, i.e., when the engine rpm Ne and pressure ratio P2/P1 are low. Accordingly, in the case of acceleration from an idle state or a low-rotation steady operating state, a control action that temporarily opens the nozzle vanes is effective, while in the case of acceleration from other states, it is advisable to dispense with such a control action that temporarily opens the nozzle vanes, and to create a state in which the opening of the nozzle vanes is closed down as far as possible. For this reason, the correction gain GVN is set as described above in the map shown in FIG. 6.

Returning now to FIGS. 4a through 4e, the reason that the absolute value of the peak value during acceleration is reduced in the shift from FIG. 4b to FIG. 4c is that a small correction gain GVN (=0.7) is selected from the map in FIG. 6. Meanwhile, the reason that the absolute value of the peak value during deceleration is increased is that a large correction gain GVN (=1.3) is selected from the map in FIG. 6 in this case. Thus, the absolute value of the amount of variation $\Delta$Ac in the opening of the accelerator is emphasized and increased, or is reduced or set at zero, in accordance with the position on the compressor characteristic map during transitional operation. As will be understood later, no correction is performed when this value is set at zero.

Next, when a filter processing is performed on the amount of variation $\Delta$Ac1 in the opening of the accelerator following correction shown in FIG. 4c, the amount of variation $\Delta$Ac2 in the opening of the accelerator following this filter processing is obtained as shown in FIG. 4d. This processing is performed by step 108 shown in FIG. 10 and the calculator 43 shown in FIG. 5. A characterizing feature here is that the waveform is blunted so that the absolute value of the peak value is decreased during both acceleration and deceleration, and the amount of variation $\Delta$Ac2 in the opening of the accelerator following the filter processing, which constitutes the output, is delayed in terms of time with respect to the amount of variation $\Delta$Ac1 in the opening of the accelerator following correction, which constitutes the input, so that the output time of the former value is longer than the input time of the latter value.

The content of the filter processing in this case will be described. In this processing, the transmission function of a first-order delay element, i.e., $F(s)=k/(sT+1)$, is used. This transmission function F(s) is obtained by subjecting a certain time function to a Laplace transformation. k is a constant; in the present embodiment, k=1. T is a time constant that is obtained from the map M3 shown in FIG. 7.

First, since the amount of variation $\Delta$Ac1 in the opening of the accelerator following correction, which is used as the input value, is a time function, this value can be expressed as $\Delta$Ac1=u(t). Then, u(t) is subjected to a Laplace transformation and thus transformed into U(s), and this U(s) is multiplied by F(s) to produce the output Y(s). y(t), which is obtained by subjecting this output Y(s) to a an inverse Laplace transformation, is the amount of variation $\Delta$Ac2 in the opening of the accelerator following the filter processing.

As is shown in FIGS. 7a and 7b, the time constant T is set at a positive value other than zero when the engine rpm Ne is in a range which is such that (idle rpm Nei)$\leq$Ne$\leq$(threshold value Nes), and is set at a value of zero in all other ranges. Furthermore, optimal values are separately set for the acceleration shown in FIG. 7a and the deceleration shown in FIG. 7b. By appropriately adjusting the value of this time constant T, it is possible to adjust the output delay time and output time length of the amount of variation $\Delta$Ac2 in the opening of the accelerator following the filter processing to optimal values.

Next, the nozzle vane opening correction value VNta shown in FIG. 4e is calculated on the basis of the amount of variation $\Delta$Ac2 in the opening of the accelerator following the filter processing shown in FIG. 4d in accordance with the nozzle vane opening correction value calculation map M4 shown in FIG. 8. This processing is performed by step 109 in FIG. 10.

As is shown in FIG. 8, the horizontal axis of the nozzle vane opening correction value calculation map M4 indicates the amount of variation $\Delta Ac2$ in the opening of the accelerator following the filter processing, and the vertical axis indicates the nozzle vane opening correction value VNta. Furthermore, in a range in which $\Delta Ac2$ varies from zero to specified values on the + side (acceleration side) and − side (deceleration side), i.e., in the range of $x3<\Delta Ac2<x1$, the opening correction value VNta is zero. Furthermore, $x3<0$, $x1>0$, and the absolute values of $x3$ and $x1$ may be the same or different. On the acceleration side, in the range where $x1 \leq \Delta Ac2 \leq x2$, the opening correction value VNta increases in the + direction (opening direction) at a large rate of increase as $\Delta Ac2$ increases, and in the range where $x2<\Delta Ac2$, the opening correction value VNta increases in the + direction (opening direction) at a small rate of increase as $\Delta Ac2$ increases. On the deceleration side, the opening correction value VNta has a fixed value on the + side when $\Delta Ac2 \leq x3$. Thus, nozzle vane opening correction is performed only in the opening direction in the case of transitional operation.

According to this map M4, the waveform on the acceleration side in FIG. 4d has not reached the positive threshold value $x1$; accordingly, as is shown in FIG. 4e, the opening correction value VNta is zero, and no correction is performed. On the other hand, approximately half of the upper part of the waveform on the deceleration side in FIG. 4d has exceeded the negative threshold value $x3$; accordingly, the positive correction value VNta shown in FIG. 4e appears only for the time that this threshold value is exceeded, so that a correction is performed.

The opening correction value VNta thus calculated is added to the basic opening target value VNt0; as a result, the final opening target value VNt of the nozzle vanes is determined, and the actual opening of the nozzle vanes is controlled so that this opening conforms to this value. In the example shown in FIGS. 4a through 4e, a control action that temporarily opens the nozzle vanes is performed.

To add a description here, the basic map that determines the vane opening correction value is the nozzle vane opening correction value calculation map M4 shown in FIG. 8. The input value that is applied to this is originally the amount of variation $\Delta Ac$ in the opening of the accelerator; in this control, however, a value in which the amount of variation $\Delta Ac$ in the opening of the accelerator is corrected by multiplying this amount of variation $\Delta Ac$ in the opening of the accelerator by the correction gain GVN (step 106 in FIG. 10) and performing a filter processing (step 108 in FIG. 10) is used as the input value. As a result, a so-called input limitation is applied. Furthermore, even in cases where there is an input (i.e., in cases where the input is not zero), the opening correction value VNta is zero, and no correction is performed, if the absolute value of the input value is less than a specified value (corresponding to the range $x3<\Delta Ac2<x1$). In other words, the output is limited. An approach that limits the output is similar to that used in a conventional technique; the characterizing feature of the present invention is rather the limitation of the input.

In regard to this limitation of the input, this is a configuration in which a correction (or alteration) of the input value that is separate from the multiplication by the correction gain GVN or filter processing is performed. Accordingly, in the present embodiment, modifications in which both corrections are performed, or in which only one or the other of these corrections is performed, are conceivable; furthermore, a modification in which the order of the two corrections is reversed is also conceivable.

Furthermore, in cases where only the multiplication by the correction gain GVN is performed, the amount of variation $\Delta Ac1$ in the opening of the accelerator following correction that is obtained by multiplying the amount of variation $\Delta Ac$ in the opening of the accelerator by the correction gain GVN is the input value (value on the horizontal axis) for the basic map M4. Moreover, in cases where only the filter processing is performed, the filter processing is performed directly on the amount of variation $\Delta Ac$ in the opening of the accelerator. In cases where the order of the two corrections is reversed, the input value for the filter processing is the amount of variation $\Delta Ac$ in the opening of the accelerator, and the amount of variation $\Delta Ac2$ in the opening of the accelerator following the filter processing, which is the output value of the filter processing, is the object of multiplication by the correction gain GVN; then, the amount of variation $\Delta Ac1$ in the opening of the accelerator following correction, which is obtained following this multiplication, is the input value (value on the horizontal axis) for the basic map M4.

As a result of the abovementioned multiplication by the correction gain GVN, since the map M2 shown in FIG. 6, which is used to determine the correction gain GVN, is prepared in association with the compressor characteristic map shown in FIG. 9, a correction gain GVN (and therefore an amount of variation $\Delta Ac1$ in the opening of the accelerator following correction) that conforms to the operating conditions is obtained both in the case of acceleration and the case of deceleration, and an optimal vane opening correction for transitional operation can be performed. Specifically, the magnitude of the input value in respect of the map M4 is greatly increased if the conditions are such that a correction is required, and if the conditions are such that no correction is necessary, the input value is reduced or set at zero; accordingly, an optimal correction that conforms to the current operating conditions can be performed.

Meanwhile, the time length in particular of the input value for the basic map M4 can be adjusted by the filter processing. As a result, the correction time can be lengthened in the case of conditions which are such that correction is required, and the correction time can be shortened in the case of conditions which are such that no correction is necessary. Consequently, an optimal correction conforming to the current operating conditions can be performed in the same manner as described above.

Thus, in the present invention, in the case of transitional operation of the engine such as acceleration, deceleration or the like, the opening of the nozzle vanes is not uniformly corrected when the amount of variation in the engine load exceeds a fixed value as in conventional techniques; instead, this amount of variation is changed into a value that reflects the actual operating conditions, and correction is either performed or not performed on the basis of this value. Accordingly, there is no uniform temporary increase in the opening of the nozzle vanes during transitional operation; consequently, unnecessary opening of the nozzle vanes is prevented, so that there is no wasteful escape of exhaust energy. As a result, the turbocharger can be utilized much more effectively than in conventional techniques.

Furthermore, various embodiments of the present invention are possible. For example, in the present embodiment, a first-order delay transmission function was used for the filter processing; however, it would also be possible to use (for example) a transmission function of a second-order delay or the like for this. In such a case, for example, it would also be possible to use the second power or a higher power of the time constant T, to use several time constants T among these as selected values, and to set the remaining time constants T as fixed values. Furthermore, in regard to the calculation of the correction gain, the correction gain was calculated from the engine rotational speed and pressure ratio in the present embodiment; however, if the characteristic map shown in FIG. 9 is used, the position on the characteristic map can be specified if two out of the three values of amount of intake air flow, pressure ratio and engine rotational speed are determined. Accordingly, it would also be possible to calculate the correction gain using the amount of intake air flow. The present invention can be applied not only to diesel engines, but also to engines of other types such as gasoline engines or the like.

In short, the present invention offers the following superior merit: namely, the wasteful escape of exhaust energy resulting from unnecessary opening of the nozzle vanes can be prevented, so that much more efficient utilization of the turbocharger can be achieved.

What is claimed is:

1. A control device for a variable-geometry turbocharger in an engine having nozzle opening adjustment means for adjusting an opening of the nozzle in a turbine inlet, comprising:

detection means for detecting rotational speed and load of said engine, and pressure on at least a compressor outlet side of said variable geometry turbocharger;

basic opening target value calculating means for calculating a basic opening target value of said nozzle on the basis of the detected values of the rotational speed and load of said engine;

load variation amount calculating means for calculating an amount of variation in the engine load per predetermined time on the basis of the detected value of said engine load;

pressure ratio calculating means for calculating a pressure ratio between the compressor outlet and inlet sides on the basis of the detected value of at least the pressure on said compressor outlet side;

correction gain calculating means for calculating a correction gain value on the basis of the detected value of said engine rotational speed and said pressure ratio;

corrected load variation amount calculating means for calculating an amount of variation in the load following correction on the basis of said correction gain and said engine load variation amount;

nozzle opening correction value calculating means for calculating a nozzle opening correction value on the basis of said amount of variation in the load following correction;

final opening target value calculating means for calculating a final opening target value of said nozzle on the basis of said basic opening target value and said nozzle opening correction value; and operating means for operating said nozzle opening adjustment means so that the actual opening value of said nozzle is an opening value that corresponds to said final opening target value.

2. The control device for a variable-geometry turbocharger according to claim 1, wherein said corrected load variation amount calculating means are means for calculating said amount of variation in the load following correction, by multiplying said engine load variation amount by said correction gain value, and said correction gain value calculated by said correction gain calculating means is set so that the correction gain value varies from a value smaller than 1 to a value exceeding 1 as the detected value of said engine rotational speed or said pressure ratio becomes smaller.

3. The control device for a variable-geometry turbocharger according to claim 2, wherein said correction gain value calculated by said correction gain calculating means is a value other than zero when the detected value of said engine rotational speed is equal to or less than a specified value and said pressure ratio is equal to or less than a specified value, and said correction gain value is zero otherwise.

4. The control device for a variable-geometry turbocharger according to claim 3, wherein said final opening target value calculating means calculate said final opening target value by adding said opening correction value to said basic opening target value.

5. The control device for a variable-geometry turbocharger according to claim 2, wherein said final opening target value calculating means calculate said final opening target value by adding said opening correction value to said basic opening target value.

6. The control device for a variable-geometry turbocharger according to claim 1, wherein said final opening target value calculating means calculate said final opening target value by adding said opening correction value to said basic opening target value.

7. A control device for a variable-geometry turbocharger having nozzle opening adjustment means for adjusting an opening of the nozzle in a turbine inlet, comprising:

detection means for detecting rotational speed and load of said engine, and pressure on at least a compressor outlet side of said variable geometry turbocharger;

basic opening target value calculating means for calculating a basic opening target value of said nozzle on the basis of the detected values of the rotational speed and load of said engine;

load variation amount calculating means for calculating an amount of variation in the engine load per predetermined time on the basis of the detected value of said engine load;

filter processing performing means for performing a filter processing using a specified transmission function on the basis of said amount of variation in the engine load, and calculating the amount of variation in the load following this filter processing;

nozzle opening correction value calculating means for calculating a nozzle opening correction value on the basis of this amount of variation in the load following the filter processing;

final opening target value calculating means for calculating a final opening target value of said nozzle on the basis of said basic opening target value and said nozzle opening correction value; and operating means for operating said nozzle opening adjustment means so that the actual opening value of said nozzle is an opening value that corresponds to said final opening target value.

8. The control device for a variable-geometry turbocharger according to claim 7, wherein said transmission function is a time constant that is determined beforehand on the basis of the engine rotational speed.

9. The control device for a variable-geometry turbocharger according to claim 8, wherein said transmission function is a transmission function of a first-order delay element.

10. The control device for a variable-geometry turbocharger according to claim 8, wherein said final opening target value calculating means calculate said final opening target value by adding said opening correction value to said basic opening target value.

11. The control device for a variable-geometry turbocharger according to claim 7, wherein said transmission function is a transmission function of a first-order delay element.

12. The control device for a variable-geometry turbocharger according to claim 11, wherein said final opening target value calculating means calculate said final opening target value by adding said opening correction value to said basic opening target value.

13. The control device for a variable-geometry turbocharger according to claim 7, wherein said final opening target value calculating means calculate said final opening target value by adding said opening correction value to said basic opening target value.

14. A control device for a variable-geometry turbocharger having nozzle opening adjustment means for adjusting a opening of the nozzle in a turbine inlet, comprising:

detection means for detecting rotational speed and load of said engine, and pressure on at least a compressor outlet side of said variable geometry turbocharger;

basic opening target value calculating means for calculating a basic opening target value of said nozzle on the basis of the detected values of the rotational speed and load of said engine;

load variation amount calculating means for calculating an amount of variation in the engine load per predetermined time on the basis of the detected value of said engine load; pressure ratio calculating means for calculating a pressure ratio between the compressor outlet and inlet sides on the basis of the detected value of at least the pressure on said compressor outlet side;

correction gain calculating means for calculating a correction gain value on the basis of the detected value of said engine rotational speed and said pressure ratio;

corrected load variation amount calculating means for calculating an amount of variation in the load following correction on the basis of said correction gain and said engine load variation amount;

filter processing performing means for performing a filter processing using a specified transmission function on the basis of said amount of variation in the load following correction, and calculating the amount of variation in the load following this filter processing;

nozzle opening correction value calculating means for calculating a nozzle opening correction value on the basis of the amount of variation in the load following the filter processing;

final opening target value calculating means for calculating a final opening target value of said nozzle on the basis of said basic opening target value and said nozzle opening correction value; and operating means for operating said nozzle opening adjustment means so that the actual opening value of said nozzle is an opening value that corresponds to said final opening target value.

15. A control method for a variable-geometry turbocharger having nozzle opening adjustment means for adjusting an opening of the nozzle in a turbine inlet, comprising the steps of:

detecting rotational speed and load of the engine, and pressure on at least a compressor outlet side of said variable geometry turbocharger;

calculating a basic opening target value of said nozzle on the basis of the detected values of the rotational speed and load of said engine;

calculating an amount of variation in the engine load per predetermined time on the basis of the detected value of said engine load;

calculating a pressure ratio between the compressor outlet and inlet sides on the basis of the detected value of at least the pressure on said compressor outlet side;

calculating a correction gain value on the basis of the detected value of said engine rotational speed and said pressure ratio;

calculating an amount of variation in the load following correction on the basis of said correction gain value and said engine load variation amount;

performing a filter processing using a specified transmission function on the basis of said amount of variation in the load following correction, and calculating the amount of variation in the load following this filter processing;

calculating the nozzle opening correction value on the basis of the amount of variation in the load following the filter processing;

calculating a final opening target value of said nozzle on the basis of said basic opening target value and said nozzle opening correction value; and operating said nozzle opening adjustment means so that the actual opening value of said nozzle is an opening value that corresponds to said final opening target value.

\* \* \* \* \*